(12) United States Patent
Lemke (10) Patent No.: US 8,378,132 B2
(45) Date of Patent: Feb. 19, 2013

(54) PROCESS FOR PRODUCING METHYL ESTERS

(76) Inventor: Daniel W. Lemke, Cokato, MN (US)

( * ) Notice: Subject to any disclaimer, the term of this patent is extended or adjusted under 35 U.S.C. 154(b) by 646 days.

(21) Appl. No.: 12/527,158

(22) PCT Filed: Feb. 15, 2008

(86) PCT No.: PCT/US2008/002076
§ 371 (c)(1),
(2), (4) Date: Nov. 19, 2009

(87) PCT Pub. No.: WO2008/103309
PCT Pub. Date: Aug. 28, 2008

(65) Prior Publication Data
US 2010/0087671 A1 Apr. 8, 2010

Related U.S. Application Data

(60) Provisional application No. 60/901,961, filed on Feb. 16, 2007, provisional application No. 61/013,250, filed on Dec. 12, 2007.

(51) Int. Cl.
*C11C 3/00* (2006.01)
(52) U.S. Cl. ............... 554/169; 554/1; 554/170
(58) Field of Classification Search ............... None
See application file for complete search history.

(56) References Cited

U.S. PATENT DOCUMENTS

| | | | |
|---|---|---|---|
| 4,303,590 A | 12/1981 | Tanaka et al. |
| 5,399,731 A | 3/1995 | Wimmer |
| 6,822,105 B1 | 11/2004 | Luxem et al. |
| 6,878,837 B2 | 4/2005 | Bournay et al. |
| 6,965,044 B1 | 11/2005 | Hammond et al. |
| 2001/0042340 A1 | 11/2001 | Tateno et al. |
| 2003/0229238 A1 | 12/2003 | Fleisher |
| 2005/0081431 A1 | 4/2005 | Nakayama et al. |
| 2005/0081435 A1 | 4/2005 | Lastella |
| 2006/0080891 A1 | 4/2006 | Ghosh et al. |

OTHER PUBLICATIONS

Zhou, H. et al., Solubility of multicomponent systems in the biodiesel production by transesterificatin of Jatropha Curcas L. Oil with methanol, 2006, J. Chem. ENg. Data, vol. 51, No. 3, pp. 1130-1135.*

Encinar, J.M., et al., Biodiesel from used frying oil. Variables affecting the yields and characteristics fothe biodiesel, 2005, Ind. Eng. Chem. Res., vol. 44, No. 15, pp. 5491-5499.*

Muniyappa, Praveen R. et al., "Improved Conversion of Plant Oils and Animal Fats into Biodiesel and Co-product", Bioresource Technology,1996; pp. 19-24, vol. 56, Elsevier Science Limited,Great Britain.

Kulkarni, Mangesh G. et al.,"Waste Cooking Oil—An Economical Source for Biodiesel: A Review", Industrial Engineering Chemistry Research, 2006, pp. 2901-2913, vol. 45, No. 9, American Chemical Society, (published on the web).

Noureddini, Hossein et al.,"A Continuous Process for the Conversion of Vegetable Oils into Methyl Esters of Fatty Acid", Journal of the American Oil Chemists' Society, 1998, pp. 1775-1783, vol. 75, No. 12, Department of Chemical Engineering, Univ. of Nebraska—Lincoln, United States.

Schuchardt, Ulf et al., "Transesterification of Vegetable Oils: a Review", Journal of Brazilian Chemical Society, 1998, pp. 199-210, vol. 9, No. 1, Brazil.

* cited by examiner

*Primary Examiner* — Yate K Cutliff (57) ABSTRACT

Transesterification systems and methods for producing methyl ester are disclosed. In one embodiment, a method for producing methyl ester includes introducing a first charge into a reactor. The first charge contains a triglyceride-containing fat and an alcohol. The method can also include performing a first transesterification reaction in which the triglyceride-containing fat is reacted with the alcohol to produce a first product. The method can further include settling the first product into a methyl ester-containing layer and a glycerol-containing layer, decanting the glycerol-containing layer after settling from the reactor, mixing a second charge with the first product, and performing a second transesterification reaction after mixing the second charge with the first product.

15 Claims, 8 Drawing Sheets

PROCESS FOR PRODUCING METHYL ESTERS

CROSS-REFERENCE TO RELATED APPLICATIONS

This application claims priority to international application PCT/US2008/002076, entitled "PROCESSES FOR PRODUCING METHYL ESTER," filed 15 Feb. 2008, which claims priority to 1) U.S. Provisional Patent Application No. 60/901,961, entitled "PROCESSES FOR PRODUCING METHYL ESTER," filed 16 Feb. 2007, and 2) U.S. Provisional Patent Application No. 61/013,250, entitled "PROCESSES FOR PRODUCING METHYL ESTERS," filed 12 Dec. 2007, the disclosure of each is incorporated herein by reference in its entirety.

TECHNICAL FIELD

The present disclosure relates generally to transesterification processes useful for producing alkyl esters from triacylglycerides and alkyl esters so produced. Aspects of the disclosure are particularly directed to producing methyl ester from triglyceride-containing fats such as vegetable and animal fats to form "biofuels", e.g., "biodiesel".

BACKGROUND

"Biodiesel" typically refers to a diesel-equivalent, processed fuel derived from biological sources. Presently, one technique for producing biodiesel is based on transesterifying vegetable oils (e.g., soybean oil, rapeseed oil, and corn oil) or animal fats (e.g., tallow) in the presence of a catalyst to produce alkyl esters. The transesterification process can also produce glycerol, fatty acid, soap, and/or other undesirable contaminants. Even though the target specification for biodiesel varies from country to country, the total glycerol content in biodiesel is typically limited to about 0.25 to about 0.38 weight percent (wt %) or less.

Such a low glycerol requirement normally requires a two-step addition of the catalyst during the transesterification process. However, even with the two-step addition of the catalyst, it can still be difficult to meet the glycerol requirement when fats with high acid values, methanol with high moisture, and/or other low quality feedstock is used. For example, most commercial biodiesel production typically requires vegetable oil feedstocks with acid values of 3 or less, preferably 1 or less. Accordingly, there is a need for a more efficient and cost-effective technique for transesterifying triglyceride-containing fats to produce biodiesel or other alkyl esters.

DETAILED DESCRIPTION

Overview

Specific details of several embodiments of the disclosure are described below with reference to transesterification systems and processes for producing alkyl ester, typically methyl ester, from triglyceride-containing fats. The term "methyl ester" generally refers to carboxylic esters formed from organic acids and methanol. Several other embodiments of the transesterification system may have different configurations, components, or procedures than those described in this section. For example, the following discussion refers specifically to methyl esters, which are most commonly used for biodiesel fuel. Those skilled in the art will recognize, however, that the described systems and processes can also be used in producing ethyl esters, propyl esters, and/or other alkyl esters by using a different alcohol, e.g., ethanol or propanol instead of methanol, in the transesterification reaction. A person of ordinary skill in the art, therefore, will accordingly understand that the invention may have other embodiments with additional elements, or the invention may have other embodiments without several of the elements shown and described below with reference to FIGS. 1-7.

One aspect of the present disclosure is directed toward a method for producing high-quality alkyl ester. In some applications, the method can yield acceptable biodiesel even when using low-grade feedstock. In certain embodiments, the method includes introducing a first charge into a reactor. The first charge includes a triglyceride-containing first fat, a first alcohol, and a first base. A first transesterification reaction is performed; the first fat reacts with the first alcohol to produce a first reaction product that comprises an alkyl ester and glycerol. The first reaction product is contacted with a triglyceride-containing second fat to yield an intermediate product. The intermediate product is separated into a first alkyl ester-rich fraction and a first glycerol-rich fraction. The alkyl ester-rich fraction is contacted with a second alcohol and a second base. A second transesterification reaction is performed and produces a second reaction product that comprises glycerol and an alkyl ester. The second reaction product may be separated into a second alkyl ester-rich fraction and a second glycerol-rich fraction.

This disclosure also sets forth a method for producing methyl ester in which a first fat is reacted with a first quantity of methanol in the presence of a first quantity of a catalyst to produce a reaction product that comprises an alkyl ester and glycerol. The first fat comprises at least one of a vegetable oil and an animal fat. The first quantity of methanol comprises between about 13 wt % and about 22 wt % of the combined weight of the first fat, the first quantity of methanol, and the first quantity of the catalyst. The reaction product is contacted with a triglyceride-containing second fat to yield an intermediate product, which may be separated into a methyl ester-rich fraction and a glycerol-rich fraction. The methyl ester-rich fraction is contacted with a second quantity of methanol and a second quantity of the catalyst, the second quantity of methanol comprising no greater than about 14 weight percent of the combined weight of the second fat, the second quantity of methanol, and the second quantity of the catalyst.

In another aspect of the present disclosure, the amount of the second triglyceride-containing fat can be varied to achieve desired cost, throughput, and quality goals. For example, the combined first product and second charge may include about 10-80 wt %, e.g., 25-70 wt % or 40-60 wt %, of the crude methyl ester from the second triglyceride-containing fat, and about 20-90 wt %, e.g., 30-75 wt % or 40-60 wt %, of the first product from the first reaction. These weight percentages reflect only the relative quantities of the crude methyl ester and the second triglyceride-containing fat. The weight of the second quantity of methanol, the catalyst, and any other components of the second reaction are not included in these percentages. Hence, for every part of the crude methyl ester from the first reaction, the second charge may include about 0.10-4.0, e.g., about 0.20-1.6, about 0.5-1.4 or about 0.8-1.2 parts of the second triglyceride-containing fat on a weight basis.

In another aspect of the disclosure, methanol in the first reaction is typically in excess. For example, the first charge may include about 5-10 wt % methanol in excess of the stoichiometric amount. The excess methanol helps to drive the first reaction toward producing methyl ester, and is then carried forward into the second reaction. Afterwards, the excess methanol typically is removed, refined, and recycled. In certain embodiments though, the second charge can contain no more than, e.g., 90-100% of, the stoichiometric amount of methanol needed to transesterify the second triglyceride-containing fat. The methanol carried forward from the first reaction can still ensure an excess of methanol in the second reaction.

Transesterification System

Figure 1:
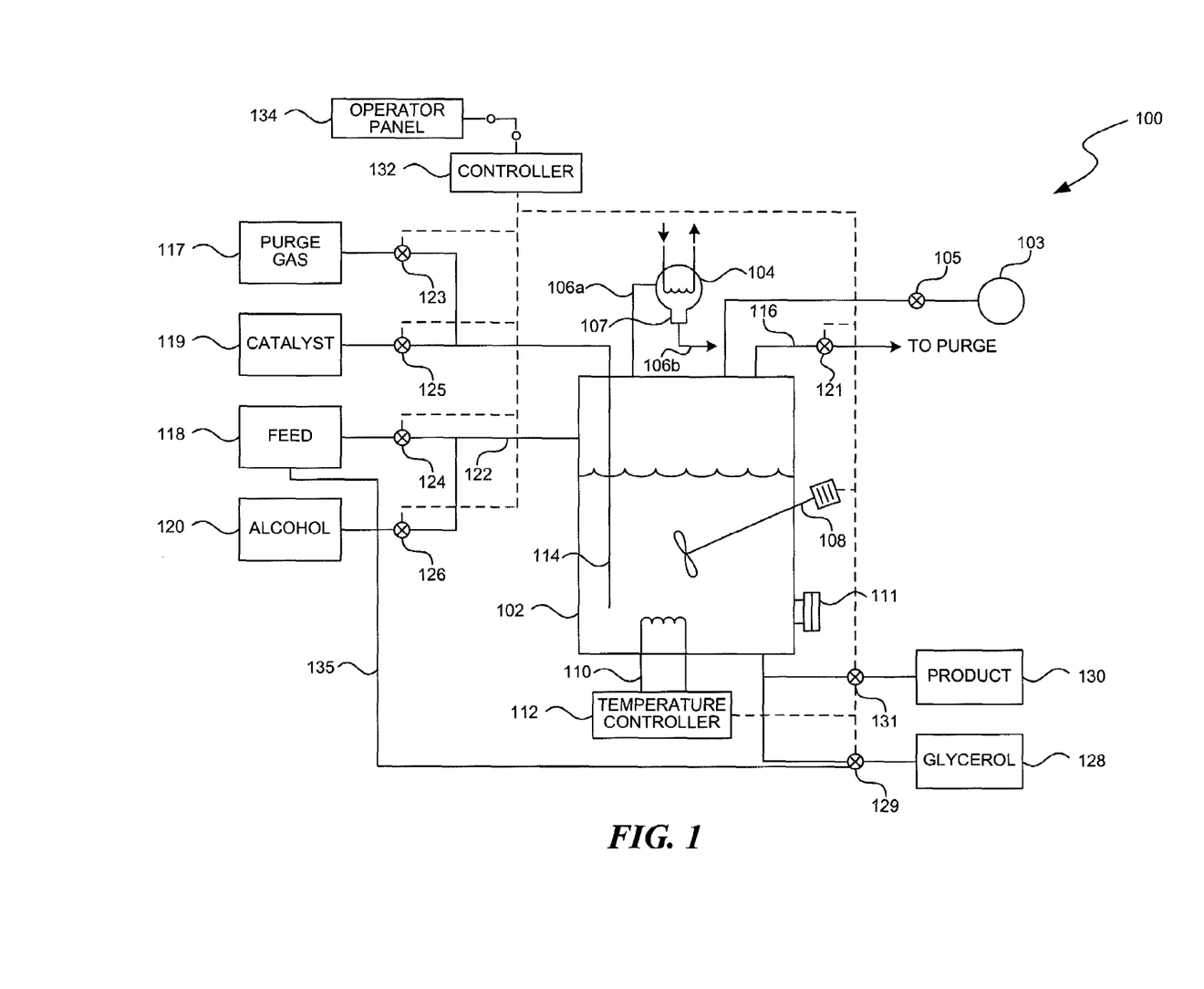
FIG. 1 is a schematic diagram of a transesterification system for producing alkyl esters in accordance with an embodiment of the disclosure.

FIG. 1 is a schematic diagram of a transesterification system 100 in accordance with an embodiment of the disclosure. The transesterification system 100 can include a reactor 102 operatively coupled to a feed storage 118, an alcohol storage 120, a catalyst storage 119, a purge gas storage 117, a glycerol storage 128, and a product storage 130.

The reactor 102 can be configured generally as a constant-stirred-tank reactor (CSTR) that includes a mixer 108 and a heat exchanger 110 operatively coupled to a temperature controller 112. The temperature controller 112 includes a computer readable medium containing instructions (e.g., proportional-integral-derivative control loops) to control and/or maintain a desired temperature in the reactor 102. The reactor 102 can optionally include a sight glass and/or other transparent component 111 that allows an operator to observe the appearance of contents in the reactor 102. The reactor 102 can further include a sparger 114 configured to supply a fluid to the reactor 102 and a vent 116 for exhausting vaporous contents from the reactor 102 via a vent valve 121.

The feed storage 118 and the alcohol storage 120 are connected to the reactor 102 via a feed valve 124 and an alcohol valve 126, respectively, in the branches of a feed line 122. The feed storage 118 can be a tank suitable to hold vegetable oil (e.g., rapeseed oil, soybean oil, or cottonseed oil), animal fats (e.g., tallow or fish oil), and/or other triglyceride-containing fat. In one modification (not specifically shown), the system 100 can include multiple feed storage units to accommodate different fats as feedstocks. For example, one embodiment discussed below uses tallow as a first fat and soybean oil as a second fat; the first and second fats could be stored in separate first and second feed storage units.

The alcohol storage 120 can be a tank suitable to hold the alcohol or alcohols used in the reaction. If methyl esters are being produced, the alcohol storage tank can hold methanol. If other alkyl esters are being produced, the alcohol storage 120 should hold an appropriate alcohol. For example, the alcohol storage 120 may hold ethanol to make ethyl esters or propanol to make propyl esters.

In one embodiment, the purge gas storage 117 and the catalyst storage 119 are connected to the sparger 114 via a purge gas valve 123 and a catalyst valve 125, respectively. The purge gas storage 117 can be a tank suitable to hold nitrogen, argon, carbon dioxide, or other purge gases. The catalyst storage 119 can be a tank suitable to hold sodium hydroxide, potassium hydroxide, sodium methylate, and/or other suitable catalysts. In other embodiments, the catalyst storage 119 can be connected to the reactor 102 via a separate port from the sparger 114. Alternatively, alcohol from the alcohol storage 120 and catalyst from the catalyst storage 119 can be delivered to the reactor 102 through the same conduit. In one particular implementation (not shown), the alcohol storage 120 can contain a mixture of the catalyst and the alcohol in a desired ratio, eliminating the need for a separate catalyst storage 119.

The glycerol storage 128 and the product storage 130 are connected to the reactor 102 via a glycerol valve 129 and a product valve 131, respectively. The glycerol storage 128 can be one or more tanks suitable to hold glycerol with water, soap, free fatty acid, and/or other impurities. The product storage 130 can be one or more tanks suitable to hold methyl ester with glycerol, water, and/or other minor impurities. In the illustrated embodiment, the glycerol valve 129 may be a 3-way valve capable of selectivity directing glycerol-rich byproduct to either the glycerol storage 128 or a return line 135 that delivers the byproduct to the feed storage 118 to pre-treat the feedstock, as noted below.

In certain embodiments, the transesterification system 100 can also include an optional overhead condenser 104 connected to the reactor 102 via a vapor conduit 106a. The condenser 104 can be a shell-and-tube heat exchanger, a plate-and-frame heat exchanger, or other types of heat exchanger. In the illustrated embodiment, the condenser 104 also includes an integral receiver 107 and a liquid conduit 106b connected to an external storage (not shown). In other embodiments, the receiver 107 can be a standalone device. In operation, the condenser 104 can condense vaporous material from the reactor 102 with a coolant (e.g., cooling water, chilled water, and/or other suitable coolant). The receiver 107 then collects and transfers the condensed material to an external storage unit (not shown).

Optionally, the transesterification system 100 can also include a vacuum generator 103 connected to the reactor 102 via a vacuum valve 105. The vacuum generator 103 can include steam jets, a liquid-ring pump, and/or other suitable vacuum generating devices. In operation, the vacuum generator 103 can reduce the pressure in the reactor 102 to 150 mmHg, 120 mmHg, 100 mmHg, or other pressures below the atmospheric pressure.

The transesterification system 100 can further include a controller 132 in electrical communication (showing in phantom lines for clarity) with the purge gas valve 123, the catalyst valve 125, the feed valve 124, the alcohol valve 126, the purge valve 121, the mixer 108, the glycerol valve 129, the product valve 131, and the temperature controller 112. This communication may be, for example, via a direct physical link, through a computer network or other network, or conducted wirelessly. The controller 132 can include a Programmable Logic Controller (PLC), a Distributed Control System (DCS), a System Logic Controller (SLC), a personal computer, and/or other suitable logic processor. The controller 132 can include a computer-readable medium containing instructions for controlling the operation of the transesterification system 100, as described in more detail below with reference to FIG. 3. In the illustrated embodiment, the controller 132 includes an optional operator panel 134 for providing process information to an operator and/or receiving input from the operator. In other embodiments, the operator panel 134 can be omitted.

Methods of Producing Alkyl Esters, e.g., Methyl Ester

The operation of the transesterification system 100 is described below with reference to FIG. 1 and FIGS. 2A-F. FIGS. 2A-F are schematic, partially cross-sectional views of contents in the reactor 102 of FIG. 1 during various stages of operation in accordance with one embodiment of the disclosure. The following discussion focuses on the production of methyl esters merely by way of example; as one familiar with the field will recognize, aspects of this discussion could also apply to other alkyl esters, e.g., ethyl esters.

Referring to FIGS. 1 and 2A-F together, in preparation for processing, the controller 132 can command the purge gas valve 123 and the vent valve 121 to open in order to purge the reactor 102 with a purge gas, e.g., nitrogen, from the purge gas storage 117. Optionally, the controller 132 can also command the feed valve 124 to open in order to rinse the reactor 102 with the triglyceride-containing fat from the feed storage 118.

After preparation, the controller 132 can command the feed valve 124, the alcohol valve 126, and the catalyst valve 125 to open in order to supply a first charge to the reactor 102 in a first processing stage. The first charge can include a first quantity of a first triglyceride-containing fat (e.g., tallow, soybean oil, etc.) from the feed storage 118, a first quantity of methanol from the alcohol storage 120, and a first quantity of a basic catalyst (e.g., sodium methylate) from the catalyst storage 119.

The quantity of methanol in the first charge is desirably at least sufficient to meet the stoichiometric requirements for the fat being treated. As suggested by the first reaction shown below, a complete conversion of triacylglyceride (TAG) to methyl ester requires 3 moles of methanol for each mole of TAG. Preferably, the first charge includes a small excess of methanol to promote the esterification reaction. It is anticipated that about 3-9 wt % methanol, e.g., about 3-8 wt % or about 4-7 wt % methanol, beyond the stoichiometric minimum will yield commercially acceptable results. The precise weight percentage of methanol to meet the stoichiometric minimum will depend to some extent on the fat being treated. For example, the molecular weight of a TAGs with a preponderance of 14-16 carbon chains attached to the glycerol backbone is lower than the molecular weight of a TAG with a larger percentage of 18-, 20-, or 22-carbon chains. Typically, though, the stoichiometric requirements of most vegetable oils and tallow, for example, will be about 10.5-11.0 wt %. Consequently, the total weight percentage of methanol in the first charge is expected to be about 13-22 wt %, preferably about 13.5-20 wt %, e.g., about 13.5-19 wt % or about 14-18 wt %.

The quantity of catalyst can be varied within a relatively broad range, e.g., about 0.05-4 wt %. If the first triglyceride-containing fat has high levels of free fatty acids, the free fatty acids (FFAs) will tend to neutralize the caustic catalyst. It may be useful to increase the amount of catalyst employed in the first charge to ensure sufficient catalyst remains to catalyze the transesterification reaction. In certain embodiments employing sodium methoxide in methanol as a catalyst, a catalyst addition of about 0.1-2.0 wt %, e.g., 0.1-1.0 wt % or 0.1-0.5 wt %, is expected to work well. In one useful implementation, the catalyst in the first charge includes a threshold amount sufficient to stoichiometrically neutralize the FFAs plus an additional 0.1-0.3 wt %.

Figure 2A:
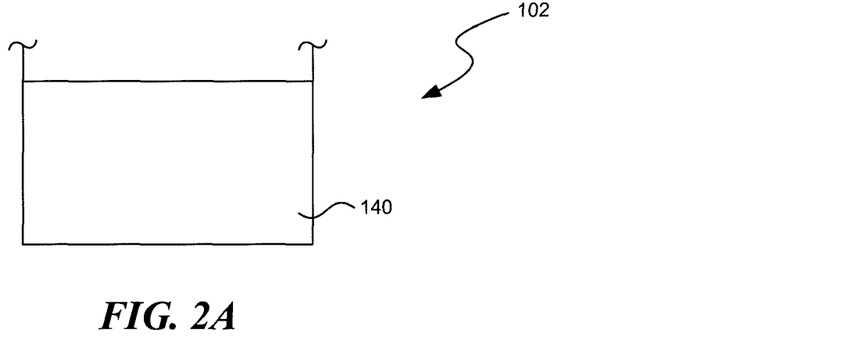
FIGS. 2A-F are schematic, partially cross-sectional views of liquid contents in the reactor of FIG. 1 during various stages of operation.

The controller 132 can then command the mixer 108 to start agitating contents in the reactor 102. As shown in FIG. 2A, the mixer 108 can mix the triglyceride-containing fat, methanol, and the catalyst in the first charge to form a substantially uniform liquid mass 140 in the reactor 102. The controller 132 can also command the temperature controller 112 to achieve and/or maintain a desired temperature in the liquid mass 140. Suitable temperatures may range from about 0° C. to about 100° C., e.g., about 20-90° C. Certain commercially useful applications employ a temperature of about 40-80° C., e.g., about 50-70° C., about 55-65° C., about 50° C., about 55° C., about 60° C., or about 65° C. The controller 132 can also command the vacuum generator, vacuum valve 105, and vent valve 121 to control pressure in the reactor 102. Suitable pressure ranges during a transesterification reaction may be maintained in the range of about 0.2-5.0 atmospheres, e.g., about 0.8-3.0 atm or about 1.0-1.5 atm. In one useful embodiment, the transesterification reaction takes place at atmospheric pressure.

Under these conditions, it is believed, without being bound by theory, that the first triglyceride-containing fat in the first charge can react with methanol in a first transesterification reaction to produce a first product containing methyl ester and glycerol as illustrated below:

In the reaction above, and in all other reactions described herein, R represents alkyl groups, and R=$R_1$, $R_2$, or $R_3$. $R_1$, $R_2$, and $R_3$ can be the same as or different from one another.

The transesterification reaction can also produce mono-acylglyceride (MAG), di-acylglyceride (DAG), and/or other intermediates, as illustrated below:

-continued

The produced methyl ester can also dissociate in a basic solution to form free fatty acid, soap, and/or other undesirable byproducts as illustrated below:

Accordingly, the first product is believed to include methyl ester, glycerol, MAG, DAG, unreacted tri-acylglyceride (TAG), free fatty acid, and soap.

Figure 2B:
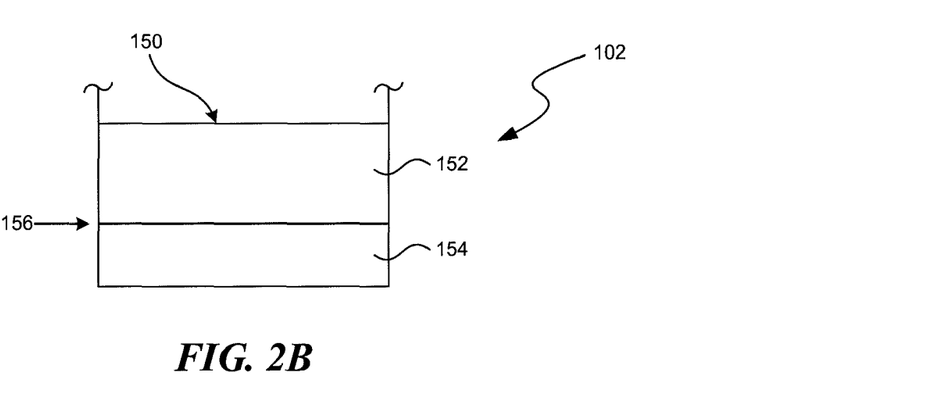

The reaction conditions in the reactor 102 can be maintained until the first reaction has achieved a desired conversion (e.g., at least about 80%). The conversion can be determined based on a reaction time period (e.g., about 4-6 hours), or analysis of the product, e.g., using gas chromatography, for concentrations of MAG, DAG, TAG, glycerol, and/or other compounds in the first product. The conversion can also be based on the appearance of the first product. Without being bound by theory, it is believed that methyl ester and glycerol have limited solubility in each other. As a result, the first product 150 tends to settle into a top layer 152 and a bottom layer 154 separated by a boundary 156, as illustrated in FIG. 2B. The top layer 152 is a reaction product that is rich in methyl ester, but includes unreacted and partially reacted triglycerides and other impurities; for sake of convenience, this methyl ester-rich reaction product 152 may be referred to simply as methyl ester below. The bottom layer 154 is a reaction byproduct that is rich in glycerol, but includes MAG, DAG, soap and other components; for sake of convenience, this byproduct 154 may be referred to simply as glycerol or crude glycerol below.

The inventor has recognized that MAG, DAG, soap, free fatty acid, and/or other reaction intermediates/contaminants can create emulsion between the top and bottom layers 152, 154. If the first reaction is incomplete, e.g., a large amount of intermediates/contaminants are present, the boundary 156 would appear "cloudy." If the first reaction is substantially completed, the boundary 156 would appear clearly identifiable to an operator. Accordingly, the operator can determine the desired conversion by monitoring the appearance of the boundary 156 via the transparent component 111.

After the desired conversion is achieved in the first processing stage, a second processing stage can be performed in the reactor 102, which can both improve the quality of the first product and increase the total volume of methyl ester produced. The second processing stage can include at least one of removing the glycerol-containing portion of the first product from the reactor 102; generating and/or introducing a solvent into the first product; and performing a second transesterification reaction to produce a product with improved quality, as described in more detail below. The solvent can reduce the amount of intermediates/contaminants that might can attract glycerol in the first product into the crude methyl ester 152.

In one embodiment, after the first transesterification reaction, a second triglyceride-containing fat can be mixed with the first product 150 in the reactor 102. The second fat can be the same as or different from the first fat that was used in the first charge. For example, the first charge can contain tallow, and the second charge can contain soybean oil. In other embodiments, the first and second fats may be the same, e.g., both may be soybean oil.

The amount of the second fat can be varied to achieve desired cost, throughput, and quality goals. For example, the combined first and second charges may include about 10-80 wt %, e.g., 25-70 wt % or 40-60 wt %, of the second fat and about 20-90 wt %, e.g., 30-75 wt % or 40-60 wt %, of methyl ester from the first reaction, each based on the total weight of the second fat and the methyl ester. Alternatively, the ratio of the weight of the first fat in the first charge to the weight of the second fat in the second charge may be between about 10:1 to about 1:10, preferably about 6:1 to about 1:2, e.g., about 3:1 to about 1:1 or about 2:1. Stated in terms of percentages, the weight of the second fat may be about 10% to about 900% of the weight of the first fat, with a range of about 15% to about 200%, e.g., 33% to about 100% or about 50%, being considered useful for many commercial embodiments. In one implementation, the weight of the first fat in the first charge is at least as great as, and desirably greater than, the weight of the second fat added in the second charge.

Figure 2C:
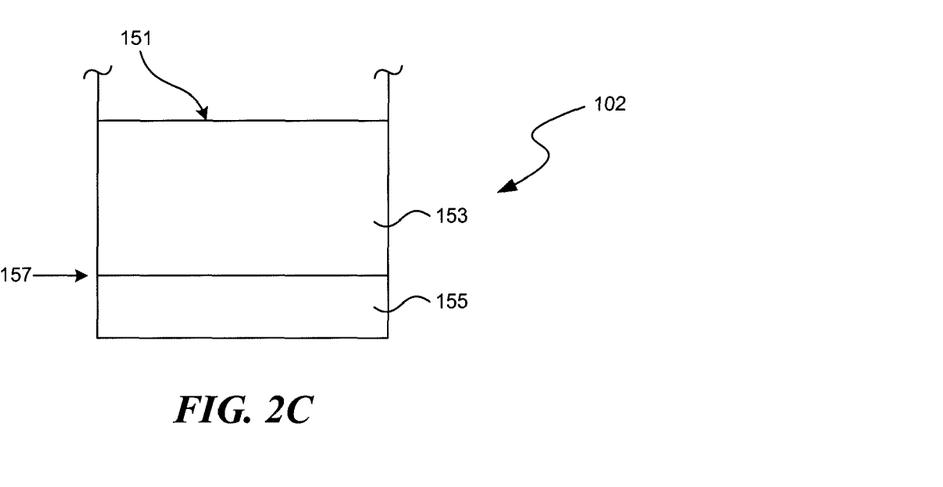
Figure 2D:
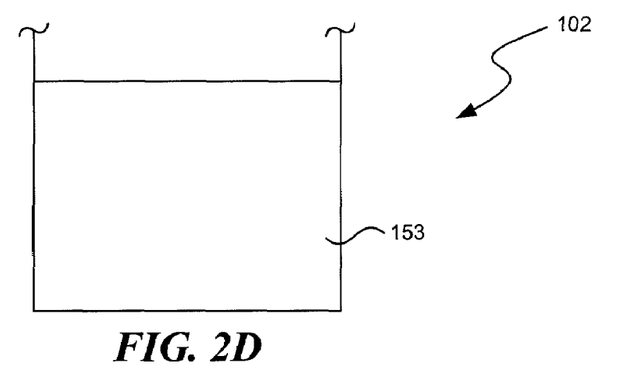

After introducing the second triglyceride-containing fat of the second charge, the contents 151 in the reactor 102 can be allowed to settle, e.g., for 1 hour, as illustrated in FIG. 2C. The top layer 153 is believed to contain methyl ester produced from the first reaction and from the second fat added in the second charge. Without being bound by theory, it is also believed that glycerol produced from the first reaction can absorb, dissolve, and/or otherwise draw water, soap, MAG, DAG, and/or other undesirable compounds in the second fat from the top layer 153 to the bottom layer 155. A boundary layer 157 may be visible between the top and bottom layers 153, 155. At this stage, the controller 132 can command the glycerol valve 129 to open in order to decant the bottom layer 155 from the reactor 102 to the glycerol storage 128, leaving substantially only the top layer 153, as illustrated in FIG. 2D. Although this disclosure refers to decanting a bottom layer, those skilled in the art will recognize that any of a variety of other known separation techniques could be used instead of decanting.

After decanting the bottom layer 155, the controller 132 can command the alcohol valve 126 and/or the catalyst valve 125 to open in order to add a second quantity of methanol and/or a second quantity of the catalyst to the reactor 102 to complete the addition of the second charge. The second quantity of methanol may be no more than, e.g., 90-100% of, the stoichiometric amount needed to transesterify the triglyceride-containing fat in the second charge. In certain implementations, the stoichiometric requirements of the transesterification reaction call for about 10-11 wt % methanol and the second quantity of methanol comprises no more than about 11 wt %, e.g., about 9-11 wt %, of the second charge. Thus, the second quantity of methanol is generally not in excess, and methanol carried forward from the first reaction is believed to be sufficient to ensure an excess of methanol in the reactor 102.

Other embodiments employ a small excess, e.g., no more than 3 wt %, such as 2 wt % or less, of methanol beyond the standard 3:1 molar stoichiometric requirements for the second fat. In such an embodiment, the second quantity of methanol comprises no more than about 14 wt %, e.g., about 10-13 wt %, of the second charge. Including excess methanol in the second charge may be particularly useful if not much excess methanol was added in the first charge and the weight of the second fat in the second charge is as great as or greater than the weight of fat in the first charge.

In certain embodiments, the second quantity of methanol and/or the second quantity of the catalyst can be added to the reactor 102 along with the second triglyceride-containing fat so the entire second charge is added in one step instead of sequentially as described above. Preferably, however, the second fat is added to the first product 150 and the resultant bottom layer 155 (FIG. 2C) is decanted before adding either the second quantity of methanol or the second quantity of catalyst. In this instance, the second charge, which includes the second fat, and additional methanol and/or catalyst, is added in two separate stages—first the fat then the methanol and/or catalyst, with an intervening step of removing glycerol-rich byproducts 155 from the reactor 102. As noted above, the crude glycerol byproduct in the bottom layer 155 includes at least some of the impurities that were introduced in the reactor 102 with the second fat. Decanting this crude glycerol from the reactor helps the second reaction, discussed below, proceed more rapidly and/or to yield a superior product.

Figure 2E:
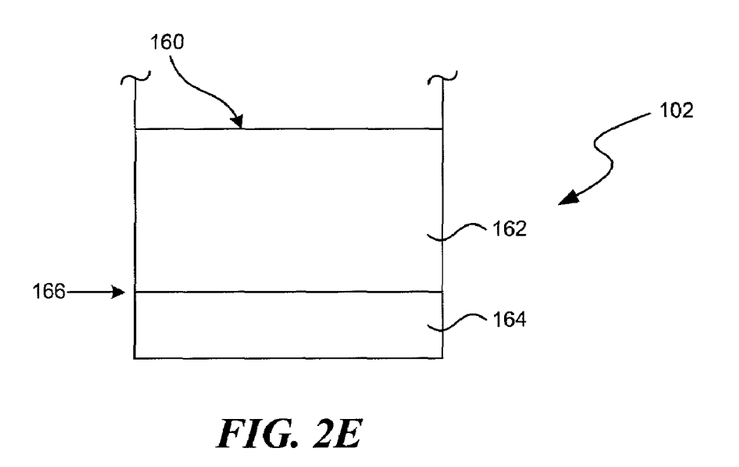

The fats in the reactor 102 can then react with methanol to produce a second product 160 at a suitable reaction temperature, e.g., about 50-70° C., in a second transesterification reaction. In one embodiment, the temperature in the reactor 102 during the second transesterification reaction may be the same as the temperature during the first transesterification reaction. In another useful adaptation, the temperature maintained in the reactor 102 during the second transesterification reaction is less than the temperature maintained during the first transesterification reaction. As illustrated in FIG. 2E, the boundary 166 reappears after the second reaction because the second reaction generates a second quantity of glycerol that separates from the top layer 162 containing methyl ester to reform the bottom layer 164.

As noted above, the first quantity of glycerol in the bottom layer 155 before the second methanol and catalyst addition (FIG. 2C) may include a number of impurities. The second quantity of glycerol generated with the additional methanol and catalyst is "fresh" in that it contains little or none of the intermediates and/or contaminants generated in the first reaction. As a result, the second quantity of glycerol produced in the second reaction can extract additional intermediates and/or contaminants from the top layer 162. For example, the second quantity of glycerol can combine with soap, free fatty acid, and/or other intermediates/contaminants in the top layer 162 and settle into the bottom layer 164. Such contaminants are believed to draw glycerol into the top layer. Pulling the contaminants into the bottom layer can, consequently, reduce the amount of glycerol in the top layer 162 such that the second transesterification reaction can be moved toward substantial completion to produce high-quality methyl ester product in the top layer 162.

The "fresh" glycerol generated in the second processing stage is typically cleaner than the first quantity of glycerol produced in the preceding reaction. In one implementation, the controller 132 of the system 100 may control the glycerol valve 129 to direct the first quantity of crude glycerol in the bottom layer 155 to the glycerol storage 128, but controls the glycerol valve 129 to direct at least a portion of the second quantity of crude glycerol in the bottom layer 164 to the feed storage 118 via conduit 135. It is believed that adding this relatively clean crude glycerol to the fat in the feed storage 118 will help reduce the level of impurities (e.g., soaps and free fatty acids) present in the feedstock. After passing through the crude feedstock, optionally with stirring, the glycerol can collect at the bottom of the feed storage 118 and be decanted off. If such a configuration is employed, it is useful to limit the amount of the glycerol delivered from the feed storage 118 to the reactor 102 as part of the first charge.

Figure 2F:
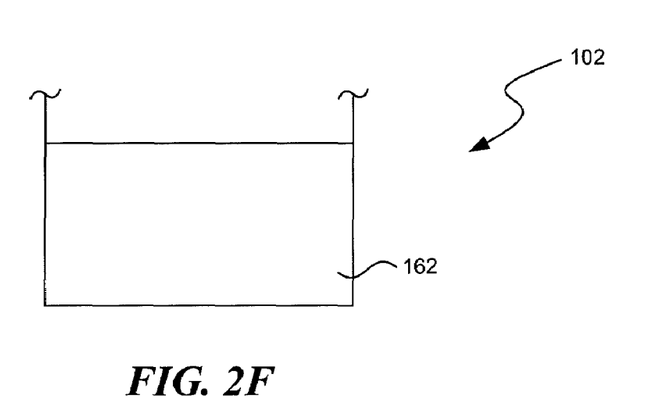

After settling, the bottom layer 164 can be decanted from the reactor 102 (or otherwise separated from the top layer 162), as illustrated in FIG. 2F. If so desired, the top layer 162 remaining in the reactor 102 can then undergo post-treatment to further process the produced methyl ester. The optional post-treatment can include removing excess methanol from the reactor 102; water washing the methyl ester; neutralizing the catalyst with, e.g., phosphoric acid, hydrochloric acid, and/or other acids; vacuum-drying, filtering, and/or other suitable purification processes. After post-treatment, the controller 132 can command the product valve 131 to open in order to transfer the methyl ester to the product storage 130.

Several embodiments of the transesterification system 100 can cost-effectively produce high quality methyl ester from low grade feedstock. Producing methyl ester via transesterification was patented in the U.S. in the 1940s. However, a bottleneck for reducing production cost has always been the requirement of high quality triglyceride-containing fat (e.g., with low acid value) and low moisture methanol. It is widely believed that triglyceride-containing fats with high acid values can produce undesirable byproducts such as soap, free fatty acid, etc., and water can reduce the effectiveness of the catalyst. As a result, a long felt need exists for a process that can produce high-quality methyl ester, e.g., with low glycerol concentration, low free fatty acid, and/or low soap content, using low-grade feedstock.

According to conventional techniques, a transesterification reaction is typically performed in two steps. First, a triglyceride-containing fat is reacted with methanol in the presence of a catalyst. Then, additional catalyst is added to the reaction to produce a final product. However, even with the additional catalyst, the final product typically still contains high concentrations (e.g., greater than 0.5 wt %) of free and combined glycerol, free fatty acid, and/or other contaminants. Before selling this product as "biodiesel", the producer must treat the product to reduce contaminants, adding expense.

The inventor has recognized that saturation of the glycerol byproduct with MAG, DAG, soap, and/or other intermediates/contaminants can at least partially cause such high glycerol concentrations in the final product. As described above, the transesterification reaction can generate at least two liquid layers: a top layer (e.g., 142 or 162) containing methyl ester/triglyceride and a bottom layer (e.g., 144 or 164) containing glycerol. The inventor has theorized that, after the glycerol is saturated with MAG, DAG, soap, and/or other intermediates/contaminants, these intermediates/contaminants can bring glycerol into the top layer. As a result, the top layer that contains methyl ester/triglyceride can also include appreciable glycerol, which can reduce the conversion of the transesterification reaction.

The inventor has resolved these problems, in certain embodiments, with the addition of the second charge containing a triglyceride-containing fat. The added fat can react in the second reaction to generate "fresh" glycerol. Without being bound by theory, it is believed that the fresh glycerol from the second reaction can further remove MAG, DAG, soap, and/or other intermediates/contaminants from the methyl ester/triglyceride-containing layer 162 to reduce the amount of intermediates/contaminants that can attract glycerol. As a result, the concentrations of glycerol in the final product can be reduced. The fresh glycerol can also remove water, soap, and/or other contaminants from the methyl ester/triglyceride-containing layer to improve the effectiveness of the catalyst and/or the purity of the final product. Accordingly, with the inventor's technique, high quality methyl ester can be produced from low grade feedstock.

The ability to use lower-quality feedstock to produce biodiesel can be particularly advantageous commercially. In conventional 2-stage base-catalyzed biodiesel production, fats typically must have an acid value (AV) of less than 1. (AV is a measure of how much potassium hydroxide is necessary to neutralize the free fatty acids (FFA) in a material, in units of milligrams of KOH per gram of material; one process for measuring AV is ASTM D 664-7.) Most commercial operations require an AV of 0.5 or less, preferably less than 0.2. If the fat feedstock has a higher acid value, producers typically must either pre-treat the feedstock to reduce FFA content or significantly process the lower-quality methyl ester produced from the transesterification process to meet common biodiesel quality requirements. For example, tallow typically has an AV over 2, e.g., 2.5 or higher. Typical base-catalyzed transesterification of tallow commonly produces tallow methyl esters with purities of 95% or less. Such crude tallow methyl ester product typically has to be distilled to separate the soaps and other byproducts in the low-grade methyl ester before selling the methyl ester as biodiesel. Such lengthy distillation is more involved and costly than the simple distillation commonly employed to remove minor amounts of residual methanol in the methyl ester.

In contrast, select embodiments of the present system and process can utilize feedstocks with relatively high AVs, yet produce biodiesel-quality esters without vigorous post-treatment. In particular, one may treat feedstocks having AVs of 2.5 or greater, e.g., 2.5-10, 2.5-6, or 3-6, in accordance with the present disclosure to produce biodiesel-quality esters. Such a high-AV fat may be used as both the first fat and the second fat mentioned above. In one particularly useful embodiment, however, the second fat has a lower AV than the first fat. For example, the first fat may be tallow having an acid value of 2.5 or greater, e.g., 2.5-5, and the second fat may be soybean oil or rapeseed oil having an acid value lower than that of the tallow, such as an AV of less than 4, e.g., less than 2 or, advantageously, 1 or less.

Several embodiments of the transesterification system 100 can also reduce the cost for removing, purifying, and/or recycling excess methanol from the transesterification reactions. For example, adding the second quantity of methanol that is in little or no excess of the stoichiometric requirement for reaction of the second fat reduces the amount of excess methanol at the end of the second reaction. Because the excess methanol in commercial biodiesel production is typically removed, stored, and refined for reuse, reducing the amount of excess methanol can reduce the total energy consumption of the process because less methanol needs to be refined.

In one illustrative example, the weight of the second triglyceride-containing fat is equal to the weight of the first triglyceride-containing fat. The first charge has an excess of methanol, e.g., 5-10 wt % more than the stoichiometric requirement, and there is no excess additional methanol in the second charge, i.e., the second quanty of methanol is no greater than the stoichiometric requirement of the second fat, e.g., 9-10 wt %. In such an example, the inventor has recognized that:

1. The reactor residence time and energy used in the conversion of the combined triglyceride-containing fats are reduced by as much as 25% per pound of product.
2. The excess methanol in the first product carried into the second reaction, in combination with the methanol added in the second charge, is adequate to complete the conversion of the triglyceride-containing fats in both the first and second charges. As a result, the amount of excess methanol can be cut significantly, e.g., by half.
3. The total amount of the catalyst can be reduced by 25% or more because the second charge requires only one catalyst addition, i.e., at the second stage, not at both the first and second stages, as in conventional processes.

Several embodiments of the transesterification system 100 can also reduce processing time and the amount of catalyst for transesterifying a desired amount of triglyceride-containing fat. For example, conventional two-stage catalyzed reaction typically requires the entire quantity of triglyceride-containing fat to be resident in both the first reaction and the second reaction. The second fat in the second charge in the embodiments described above, however, is only subject to a single catalyst addition, i.e., at the second stage. As a result, only the first fat must be resident in both the first and second stages, reducing the volume of oil, and thus the amount of time required for transesterification, during the first reaction.

Even though the operation of the transesterification system 100 described above includes decanting the bottom layer 144 after introducing the second charge in the reactor 102, in other embodiments, the bottom layer 144 can be decanted before adding the second charge containing the second triglyceride-containing fat. In further embodiments, the second charge can also contain a solvent (e.g., substantially pure glycerol) in addition to or in lieu of the second triglyceride-containing fat. The solvent can have a greater solubility for mono-acyltriglyceride, di-acyltriglyceride, glycerol, soap, free fatty acid, and/or other intermediates/contaminants than methyl ester. In these embodiments, the second charge can be added in the reactor 102 after the bottom layer 144 has been decanted but before performing the second reaction. In any of these embodiments, the process of decanting the bottom layer 144 and introducing the second charge containing a triglyceride-containing fat and/or glycerol can be repeated to achieve a desired purity in the final product.

Although the transesterification system 100 described above is well suited for batch operation, in certain embodiments, the transesterification system 100 can also operate continuously. For example, a continuous process may be carried out in a plug-flow reactor (not shown) in addition to or in lieu of the reactor 102 shown in the drawings; plug-flow reactors that may be used in or adapted for such a process are known in the art, e.g., as disclosed in US Patent Application Publication No. US 2007/0260079 A1 (Fleisher) and International Publication No. WO 2006/083250 A1 (Oulman et al.), the entirety of each of which is incorporated herein by reference.

Controller Software Modules

Figure 3:
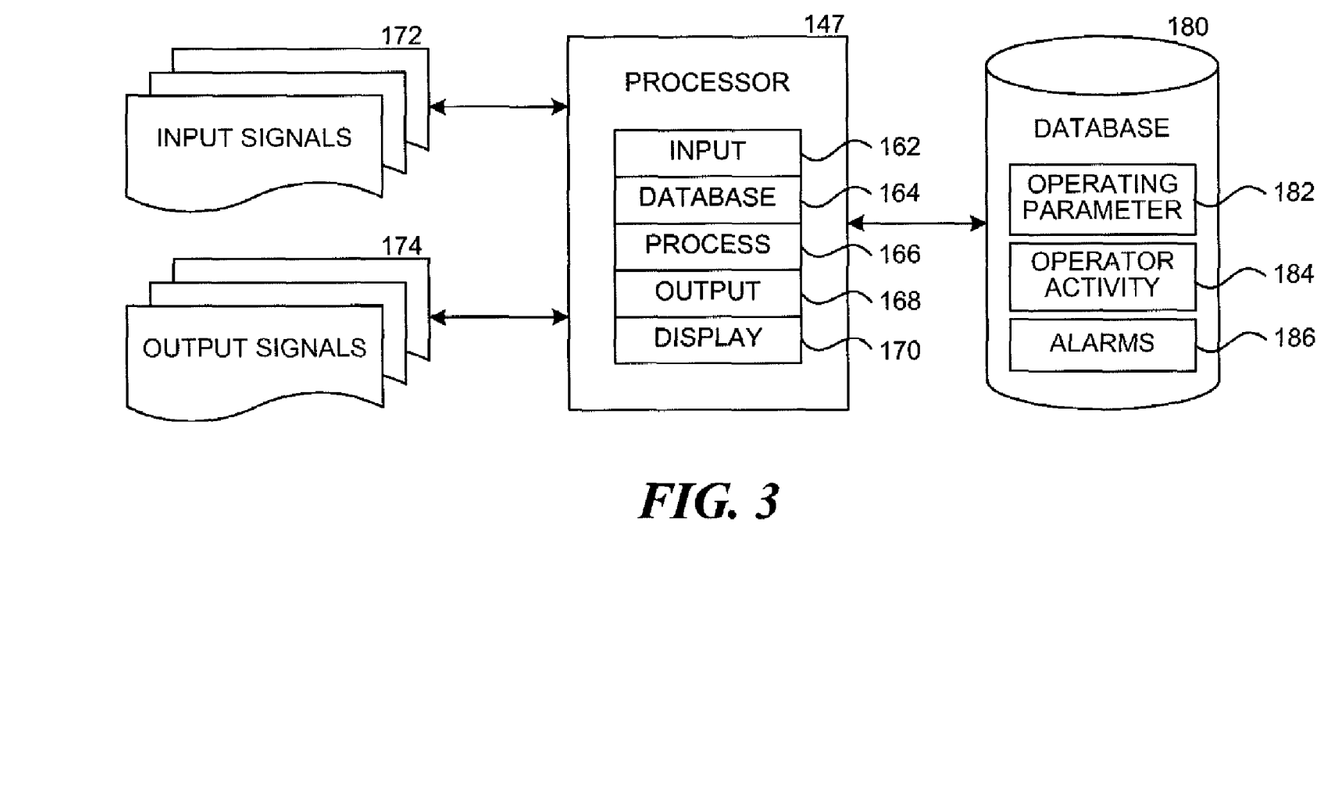
FIG. 3 is a functional diagram showing software modules configured in accordance with an embodiment of the disclosure for controlling the transesterification system of FIG. 1.

FIG. 3 illustrates a functional diagram showing software modules suitable for use in the controller 132 of FIG. 1. Each component can be a computer program, procedure, or process written as source code in a conventional programming language, such as the C++ programming language, and can be presented for execution by a processor 147. In another embodiment, the software modules can be presented for execution by a CPU of a network server in a distributed computing scheme. The various implementations of the source instructions and object and byte instructions can be stored on a computer-readable storage medium or embodied on a transmission medium in a carrier wave. In the illustrated embodiment, the modules include an input module 162, a database module 164, a process module 166, an output module 168, and optionally, a display module 170. In other embodiments, the modules can also include a network module and/or other modules.

In operation, the input module 162 accepts operating input from an operator and communicates the accepted information or selections to other components for further processing. For example, the input module 162 can accept input from an operator via the operator panel 134 of FIG. 1. The database module 164 organizes records, including operating parameters 182, operator activities 184, and alarms 186, and facilitates storing and retrieving these records to and from a database 180. Any type of database organization can be utilized, including a flat file system, hierarchical database, relational database, or distributed database, such as provided by a database vendor such as the Oracle Corporation of Redwood Shores, Calif.

The process module 166 can generate control signals based on input signals 172 (e.g., from an operator or a sensor), and/or internal signals generated by e.g., clocks, sequencers, timers, counters, PID control loops, logic comparators, etc. For example, the process module 166 can include a sequencer that can automate stages in a batch process that is described below in more detail with reference to FIG. 4. The process module 166 can also include comparators that can compare input signals to preset thresholds to generate alarms and/or interlocks. The output module 168 can generate output signals 174 based on the control signals from the process module 166. For example, the output module 168 can convert the control signals into discrete signals for actuating the various valves shown in FIG. 1. The processor 147 can optionally include the display module 170 for displaying, printing, or downloading the input signals 172 and output signals 174 via devices such as the operator panel 134. A suitable display module 170 can include a video driver that enables the processor 147 to output the input signals 172 on the operator panel 134.

Transesterification Methods

Figure 4:
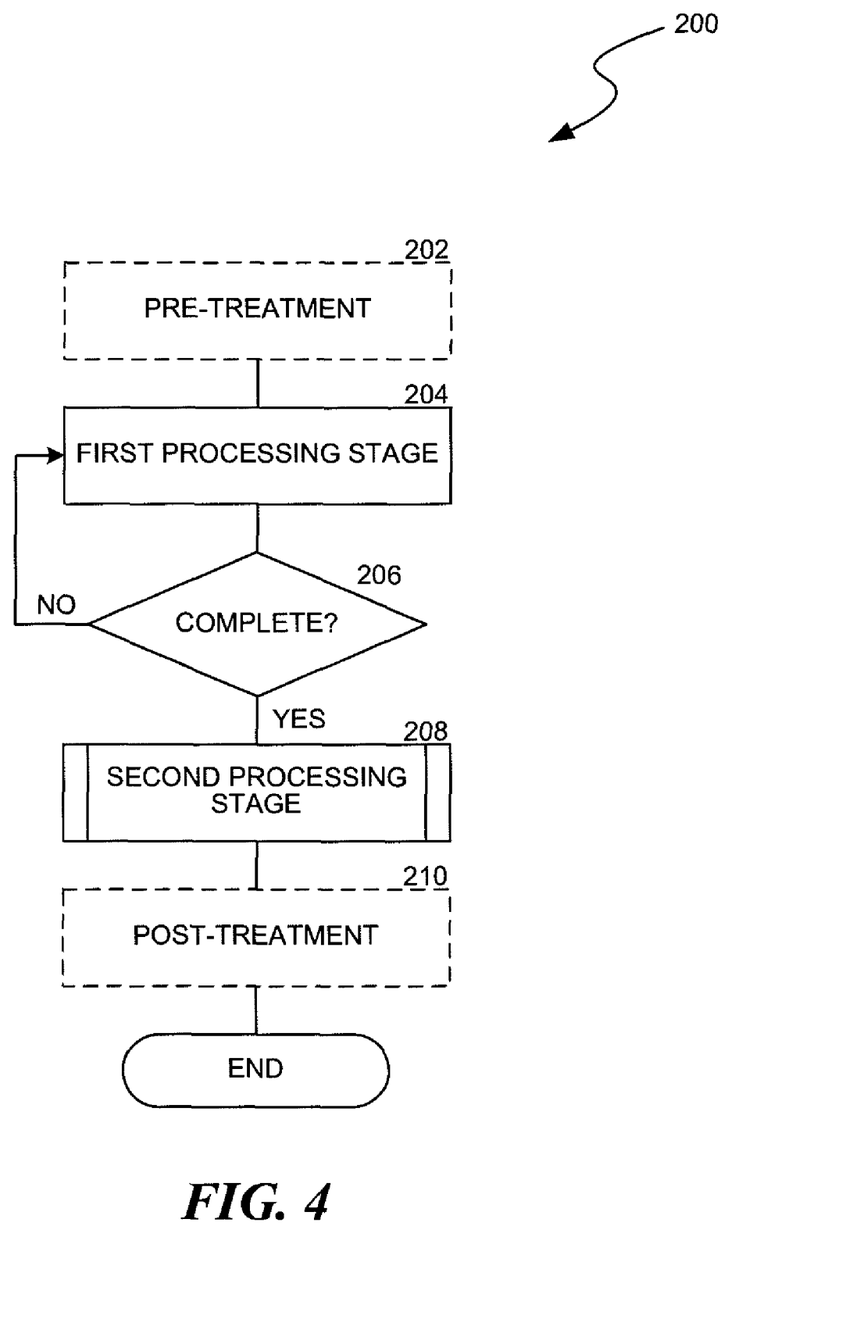
FIG. 4 is a flow chart illustrating a method for producing alkyl esters in accordance with an embodiment of the disclosure.

FIG. 4 is a flow chart illustrating a method 200 for controlling a transesterification reaction. The method 200 can be implemented as a conventional computer program for execution by, e.g., the processor 147 of FIG. 3. The method 200 is described below in the context of the transesterification system 100 of FIG. 1; however, the method 200 can also be performed in other systems with similar or different configurations.

The method 200 can include an optional pre-treatment stage 202 during which various preparatory actions can be performed. For example, the pre-treatment stage 202 can include purging the reactor 102 with nitrogen, argon, and/or other inert gases. The reactor 102 can be pre-heated to a desired temperature (e.g., 50° C.) using the heat exchanger 110. The pre-treatment stage 202 can also include drying, water washing, oil washing, distilling, and/or otherwise purifying the triglyceride-containing fat in the feed storage 118 or once the fat is delivered from the feed storage 118 to the reactor 102.

After the pre-treatment, the method 200 can include a first processing stage 204 during which a first transesterification reaction is performed. The first processing stage 204 can include adding a first charge that includes the first triglyceride-containing fat, a first quantity of methanol, and a first quantity of catalyst into the reactor 102, and conducting the first transesterification reaction at a suitable reaction temperature (e.g., 55-65° C.) with agitation. The methanol is generally in excess (e.g., about 3-10 wt %) of the required stoichiometric amount; a total methanol content of 13-22 wt %, e.g., 14-20 wt % or 15-18 wt % is expected to work well. However, in certain embodiments, the methanol can be less than or equal to the required stoichiometric amount. The catalyst content, as noted above, is commonly between 0.05 wt % and 4.0 wt %, with a preferred range of about 0.1-1.0 wt %, e.g., 0.1-0.3 wt %; higher FFA contents in the first fat may lead one to use higher catalyst content as the additional basic catalyst can neutralize the FFAs.

The method 200 can also include a decision stage 206 to determine whether the first reaction has been sufficiently completed to produce a first product containing methyl ester and glycerol. The determination can be made based on reaction time, analysis of intermediates (e.g., MAG, DAG, TAG, etc.), appearance of the material in the reactor 102, and/or other suitable criteria. If the first reaction has not been sufficiently completed, the method 200 reverts back to the first processing stage 204.

If the first reaction has been sufficiently completed, the method 200 can continue to a second processing stage 208 in which a second transesterification reaction is performed. During the second transesterification reaction, glycerol generated during the first processing stage can be removed from the reactor and additional glycerol can be generated and/or added. Various embodiments of the second processing stage 208 are described below in more detail with reference to FIGS. 5-7.

After the second processing stage 208, the method 200 can continue to an optional post-treatment stage 210 in which the produced methyl ester is further processed to derive a high-purity final product. The post-treatment stage can include methanol stripping, water washing, neutralizing, vacuum drying, filtering, distilling, and/or other suitable purification processes.

Figure 5:
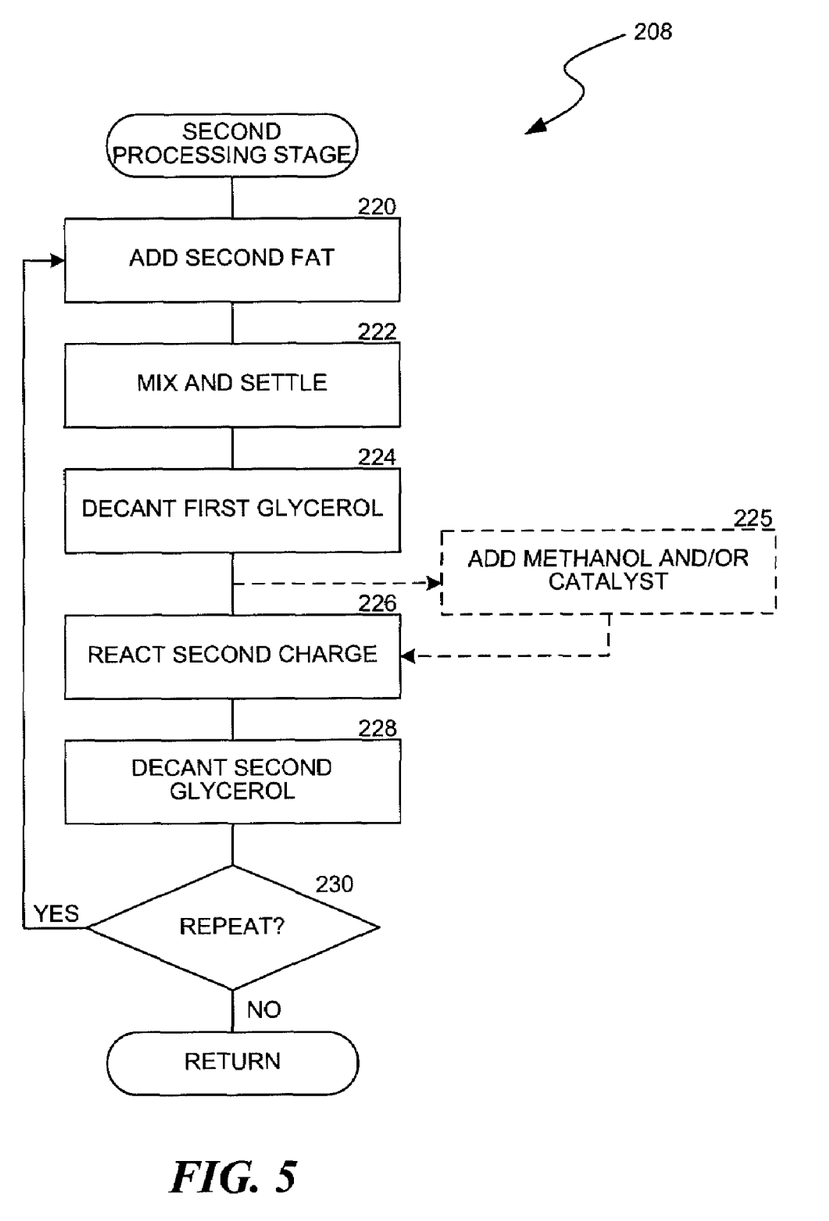
FIG. 5 is a flow chart illustrating a second transesterification processing stage suitable for use in the method of FIG. 4 in accordance with an embodiment of the disclosure.

FIG. 5 is a flow chart illustrating a second processing stage 208 suitable for use in the method 200 of FIG. 4 in accordance with an embodiment of the disclosure. In this illustrated implementation, a second charge is added to the reactor 102 in this separate step, with methanol and/or catalyst added after the additional fat. More specifically, the second processing stage 208 can include adding a second triglyceride—containing fat to the reactor 102 (block 220). As noted above, the fat may be the same as or different from the first fat in the first charge. The second fat and the first product can then be mixed and settled (block 222) before glycerol is decanted or otherwise separated (block 224). Optionally, additional methanol and/or catalyst can be added after decanting glycerol (block 225). Then, the triglyceride-containing fat in the second charge and any remaining triglyceride-containing fat from the first reaction can react with methanol in a second transesterification reaction to produce methyl ester and additional glycerol (block 226). After the second reaction is completed, this additional glycerol is decanted or otherwise separated (block 228).

Then, a decision is made to determine whether to repeat the second processing stage (block 230). The determination can be based on analysis of the second product. For example, if the analysis indicates that the concentrations of MAG, DAG, and/or other intermediates are still above a desired threshold, then the process reverts to adding another quantity of fat at block 220. The determination can also be based on a preset number of repetitions and/or other criteria. In one commercially useful implementation and in the examples set forth below, repeating the second processing stage was deemed unnecessary.

Figure 6:
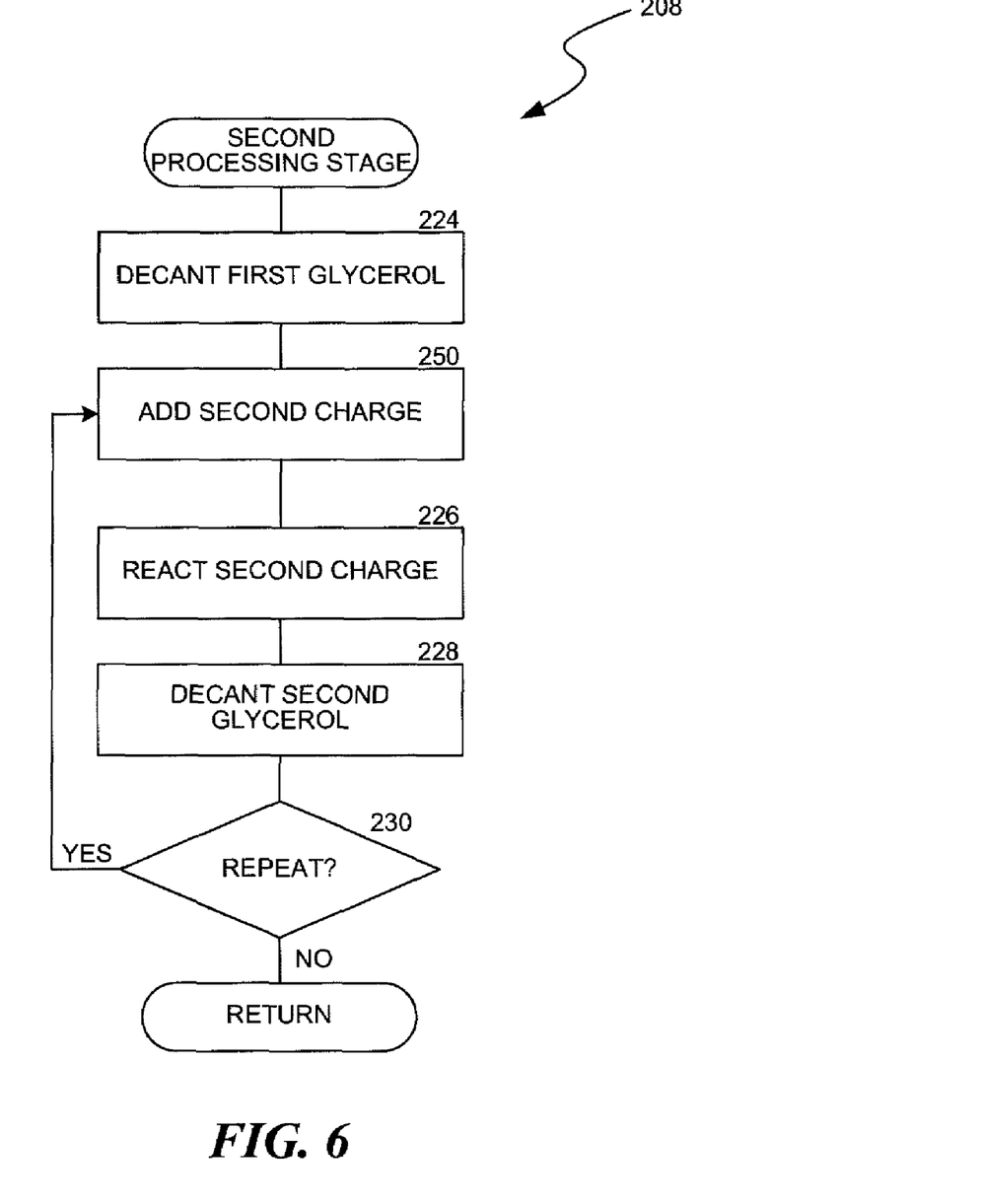
FIG. 6 is a flow chart illustrating a second transesterification processing stage suitable for use in the method of FIG. 4 in accordance with another embodiment of the disclosure.

The second processing stage 208 is described above to include adding the second charge before decanting glycerol. In another embodiment, the second charge can be added after decanting glycerol generated from the first reaction (block 250), as illustrated in FIG. 6. In this adaptation, the second charge, i.e., the second fat, the second quantity of methanol, and the second quantity of catalyst, can be added in a single stage instead of first introducing the second fat then separately adding the additional methanol and catalyst.

Figure 7:
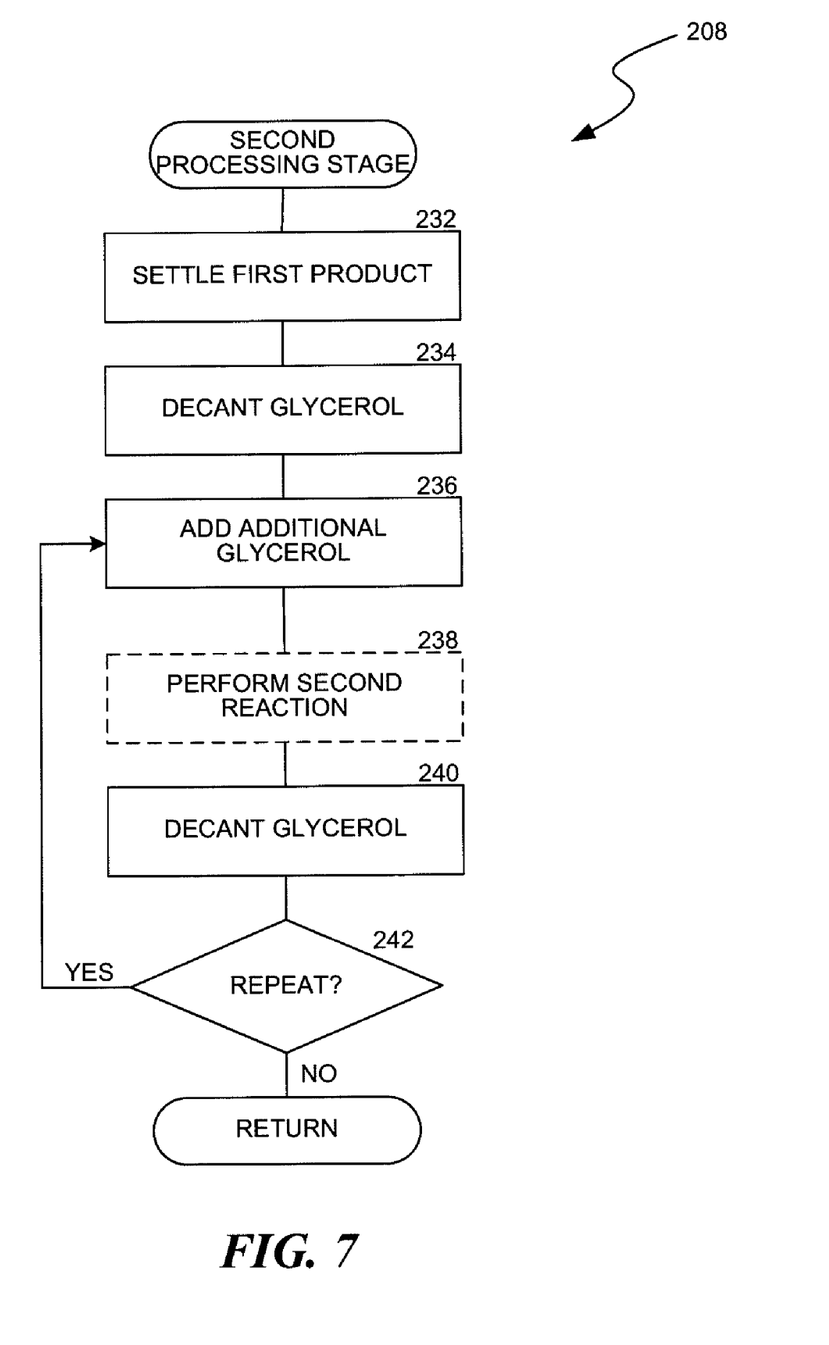
FIG. 7 is a flow chart illustrating a second transesterification processing stage suitable for use in the method of FIG. 4 in accordance with a further embodiment of the disclosure.

FIG. 7 is a flow chart illustrating a second processing stage 208 suitable for use in the method 200 of FIG. 4 in accordance with a further embodiment of the disclosure. The second processing stage 208 can include settling the first product (block 232) and decanting glycerol from the first product (block 234). Then, additional glycerol can be added to the first product (block 236). Afterwards, any remaining triglyceride-containing fat from the first reaction can then react with methanol in a second transesterification reaction to produce a second product (block 238). Glycerol can then be decanted from the second product after the second reaction is completed (block 240). Then, a decision is made to determine whether to repeat the second processing stage (block 242) generally similarly as described above with reference to FIG. 5.

EXAMPLES

Aspects of select methods in accordance with aspects of the invention are illustrated in the following examples. In these examples, the free and total glycerol content and the MAG, DAG, and TAG contents were determined in accordance with ASTM D 6584-00, and the acid value ("AV") can be measured using the procedure outlined in ASTM D 664-7, for example. Certain tests below refer to the percentage of volatiles (% volatiles) in a material. This was measured by weighing out two grams into an aluminum pan and holding in an oven at 105° C. for one hour then measuring the weight lost. Unless stated otherwise, any percentages stated below are on a weight basis, i.e., wt %.

Example 1

A single batch of crude methyl ester was prepared from tallow by a single catalyst addition. This batch was then split. One part was charged 10 wt % soybean oil, a stoichiometric level of methanol for that soybean oil, and catalyst; the other part was charged with 30 wt % soybean oil, a stoichiometric level of methanol for that soybean oil, and catalyst.

First Catalyzed Reaction: Crude Methyl Ester from Tallow:

A first charge was added to a five-liter round bottom flask fitted with agitation, nitrogen purge, condenser, and heating. The first charge included tallow (AV=1.1 and dried to <50 ppm moisture, 2854 grams, 81.5 wt %); methanol (621.6 grams, 17.8 wt %); and sodium methoxide (30% methanol solution, 24.4 grams, 0.70 wt %). The reactants were mixed and heated to 65° C. with agitation and nitrogen purge and then held for six hours. After three hours, a sample of the mixture was taken from the flask and allowed to settle in a separate container into an upper methyl ester-rich layer and a lower glycerol-rich layer. Analysis of the methyl ester-rich layer showed: MAG (0.475%); DAG (0.910%); TAG (0.360%); and total glycerol (0.297%). A second sample of the mixture was taken after six hours, allowed to settle, and analysis of the methyl ester-rich upper layer showed: MAG (0.554%); DAG (0.235%); TAG (0.064%); total glycerol (0.186%); and the % volatile=6.6%. The agitation was stopped and the mixture allowed to separate. After one hour, crude glycerol could be seen clearly at the bottom of the flask with a good phase separation between the methyl ester layer and the glycerol. The recovered glycerol yielded 420.3 grams (12.01% weight charged, % volatile=32.33%), leaving a crude methyl ester as a first reaction product. This crude methyl ester was about 89.0 wt % methyl ester.

Second Catalyzed Reaction A: 10 Wt % Soybean Oil Added to Crude Methyl Ester:

A second reaction was conducted in a two-liter round bottom flask fitted with agitation, nitrogen purge, condenser, heating and vacuum capabilities. About one kilogram (1000.2 grams, 89.0 wt %) of the first reaction product obtained from step 1; soybean oil (112.3 grams, 10 wt %); methanol (11.2 grams, 1.0 wt %); and sodium methoxide (30% methanol solution, 4.5 grams, 0.4 wt %) were added to the two-liter flask, heated to 50° C. with agitation and nitrogen purge, and then held at that temperature for four hours before stopping the agitation. The resultant mixture was allowed to settle and then split. The excess methanol in the retained product was distilled off at 80° C. After distillation, the mixture was cooled, neutralized and washed with phosphoric acid (1.3 grams) and water (13 grams). The mixture was settled, split, washed again with 13 grams water, and split. The batch was heated under vacuum (<10 mmHg) and agitation to 90° C. After half an hour it was cooled, 15 grams of Celite was added, and the product was filtered. The final results were: MAG (0.774%); DAG (0.164%); TAG (0.061%); free glycerol (0.034%); total glycerol (0.258%); AV=0.25 and Neutralization Value=0.

Second Catalyzed Reaction B: 30 Wt % Soybean Oil Added to Crude Methyl Ester:

A second reaction was conducted in a five-liter round bottom flash fitted with agitation, nitrogen purge, condenser, heating, and vacuum capabilities. This reaction differed from that in the preceding example in that it included more soybean oil, i.e., more of the new triglyceride. In particular, crude tallow methyl ester obtained from step 1 (2034.8 grams, 66.7%); soybean oil (911.09 grams, 29.89%); methanol (91.1 grams, 3.0%); and sodium methoxide (30% methanol solution, 18.1 grams, 0.6%) were added to the flask, heated to 50° C. with agitation and nitrogen purge, and then held for four hours. After, the agitation was stopped, the mixture was settled and then split. A total of 132 grams of recovered glycerol was removed. The excess methanol in the retained product was distilled off at 80° C. After distillation, the mixture was cooled, neutralized and washed with phosphoric acid (3.0 grams) and water (31 grams). The mixture was settled, split and washed again with 31 grams of water, and split. The batch was heated under vacuum (<10 mmHg) and agitation to 90° C. After half an hour it was cooled, 30 grams of Celite was added and the product was filtered. The final results were: MAG (0.731%); DAG (0.782%); TAG (0.063%); free glycerol (0.034%); total glycerol (0.314%); Acid Value=0.26 and Neutralization Value=0.

The free and total glycerol in the products from both variants of this experimental Example 1 are sufficiently low to meet the biodiesel specifications for many countries. Note that the first triglyceride, tallow, differed from the second triglyceride, soybean oil, in both variants. Also of interest, the tallow had an AV of over 1, yet the process yielded high-quality methyl ester without necessitating significant refining of the methyl ester.

Example 2

First Trial

A first charge was added to an eight thousand-gallon stainless steel reactor fitted with agitation, over head condenser, vacuum, nitrogen sparge and purge, receiver, and hot oil heating. This first charge included nitrogen-purged soybean oil (moisture of 41 ppm, 19,186 Kg, 79.08 wt %), methanol (4,877 Kg, 20.10 wt %) and sodium methylate (30% in methanol, 0.82 wt %). The charge was heated to 65° C. for four hours, which resulted in the following constitutions: MAG (0.657%), DAG (1.166%), TAG (0.095%), and total glycerol (0.417%). After six hours, the analysis showed: MAG (0.384%), DAG (0.554%), TAG (0.032%), and total glycerol (0.220%). The agitator was stopped and the batch was allowed to settle. After one hour, the glycerol layer was cut yielding 2,328 Kg (9.56 wt % of charge) of crude glycerol.

The crude methyl ester (calculated 21,935 Kg, 74.56%) was cooled to 50° C. Soybean oil (6,570 Kg, 22.33%), methanol (765 kg, 2.60%) and sodium methylate (30% in methanol, 150 Kg, 5.1%) were added to the reactor and this second charge was maintained at 50° C. After four hours, the analysis showed the following constitutions: MAG (0.803%), DAG (0.577%), TAG (0.058%), and total glycerol (0.301%). After six hours, the analysis showed that the product contained (by weight percentage): MAG (0.513%), DAG (0.374%), TAG (0.057%), and total glycerol (0.196%). The weight percentage of volatiles was 2.6 wt % in the methyl ester layer. The agitator was shut off, and the batch was settled, split, stripped of its methanol, water-washed, neutralized with phosphoric acid, and then filtered through Celite.

Production Test

A production test was conducted using an 8,000 gallon stainless steel reactor fitted with agitation, over head condenser, vacuum, a nitrogen sparge and purge, a receiver, and hot oil heating. With nitrogen purge, fancy white tallow (moisture of 45 ppm after drying at 93° C. and full vacuum for one hour, AV=2.36, soap=nil, 14,486 Kg, 57.87 wt %) and methanol (moisture=12,300 ppm, 3,681 Kg, 14.70 wt %) were charged in the reactor. The mixture was heated to 65° C. and sodium methylate (30% in methanol, 200 kg, 0.80 wt %) was added through the sparger. After four hours at 65° C., a samples was drwn and allowed to settle. Analysis showed that the methyl ester layer contained MAG (0.506%), DAG (1.69%), TAG (5.97%), total glycerol (1.007%), and 7.0 wt % volatiles. The glycerol layer contained 41.3 wt % volatiles. After six hours at 65° C., a similar analysis showed that the methyl ester layer contained MAG (0.41%), DAG (1.07%), TAG (3.9%), and total glycerol (0.671%).

Soybean oil was subsequently added to the reactor and mixed for one hour. The agitator was stopped and the batch was allowed to settle. After one hour the glycerol layer was decanted from the reactor. The interface between the glycerol layer and the methyl ester layer was very clean and easy to identify. Analysis of the methyl ester layer showed: MAG (0.069%), DAG (0.16%), TAG (11.4%), and 5.7 wt % volatiles. The glycerol layer had 37.8 wt % volatiles.

The agitator was turned on and the batch was cooled to 50° C. At 50° C., methanol (moisture=12,300 ppm, 577 Kg, 2.3 wt %) and sodium methylate (30% in methanol, 119 kg, 0.48 wt %) were charged to the reactor. The batch was maintained at about 50° C. After four hours, the analysis of the methyl ester layer showed: MAG (0.62%), DAG (0.25%), TAG (0.25%), total glycerol (0.225%), and 6.9 wt % volatiles; the glycerol layer contained 32.0 wt % volatiles. After six hours, the analysis of the methyl ester layer showed: MAG (0.42%), DAG (0.14%), TAG (0.05%), total and free glycerol (0.138%), and 5.3 wt % volatiles; the glycerol layer contained 30.9 wt % volatiles.

The agitator was shut off, and the batch was allowed to settle. Then, the glycerol layer was decanted. The interface between the glycerol layer and the methyl ester layer was very clean and easy to identify. The agitator was restarted to strip off methanol. The product was then water washed (480 kg, 1.92 wt %) and neutralized with phosphoric acid (25 kg, 0.10 wt %), water washed again (480 kg, 1.92 wt %), dried at 90° C. under full vacuum, and then filtered through Celite at 20°-23° C.

The analysis prior to drying showed: MAG (0.94%), DAG (0.206%), TAG (0.00%), total glycerol (0.289%), AV=0.32, moisture 95 ppm and appearance clear. This batch was blended with another batch prepared using the same raw materials and procedure. The result showed: MAG (0.73%), DAG (0.326%), TAG (0.522%), total glycerol (0.30%), AV=0.46, moisture 83 ppm and appearance clear.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. When the claims use the word "or" in reference to a list of two or more items, that word covers all of the following interpretations of the word: any of the items in the list, all of the items in the list, and any combination of the items in the list.

The above detailed descriptions of embodiments of the invention are not intended to be exhaustive or to limit the invention to the precise form disclosed above. Although specific embodiments of, and examples for, the invention are described above for illustrative purposes, various equivalent modifications are possible within the scope of the invention, as those skilled in the relevant art will recognize. For example, while steps are presented in a given order, alternative embodiments may perform steps in a different order. The various embodiments described herein can also be combined to provide further embodiments.

In general, the terms used in the following claims should not be construed to limit the invention to the specific embodiments disclosed in the specification, unless the above detailed description explicitly defines such terms. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A method for producing biodiesel-quality esters, comprising:
   introducing a first charge into a reactor, the first charge including a triglyceride-containing first fat, a first alcohol, and a first base, wherein the first fat has an acid value over 2;

performing a first transesterification reaction in which the first fat reacts with the first alcohol to produce a first reaction product that comprises an alkyl ester and glycerol;

contacting the first reaction product with a triglyceride-containing second fat, wherein the second fat has an acid value of less than 2, to yield an intermediate product;

separating the intermediate product into a first alkyl ester-rich fraction and a first glycerol-rich fraction;

contacting the alkyl ester-rich fraction with a second alcohol and a second base and performing a second transesterification reaction that produces a second reaction product that comprises glycerol and an alkyl ester; and separating the second reaction product into a second alkyl ester-rich fraction and a second glycerol-rich fraction.

2. The method of claim 1 wherein the first and second fats comprise the same fat and said fat is a vegetable oil or an animal fat.

3. The method of claim 1 wherein the first alcohol in the first charge is in excess of a stoichiometric amount needed to transesterify the triglycerides in the first fat.

4. The method of claim 1 wherein the weight of the first alcohol in the first charge is at least about 3 weight percent greater than a stoichiometric amount needed to transesterify the triglycerides in the first fat and the weight of the second alcohol is no greater than a stoichiometric amount needed to transesterify the triglycerides in the second fat.

5. The method of claim 1 wherein the weight of the second alcohol is less than about 3 weight percent greater than a stoichiometric amount needed to transesterify the triglycerides in the second fat.

6. The method of claim 5 wherein the weight of the second alcohol is less than the stoichiometric amount.

7. The method of claim 1 wherein the second alcohol comprises methanol and the weight of the second alcohol is no more than about 11 weight percent of the combined weight of the second fat, the second alcohol, and the second catalyst.

8. The method of claim 1 wherein the first and second alcohols each comprise methanol, the first alcohol comprises about 13.5 weight percent to about 20 weight percent of the first charge, and the second alcohol comprises no more than about 11 weight percent of the combined weight of the second fat, the second alcohol, and the second catalyst.

9. The method of claim 1 wherein a ratio of the weight of the first fat to the weight of the second fat is between about 6:1 and about 1:2.

10. The method of claim 1 wherein a ratio of the weight of the first fat to the weight of the second fat is between about 3:1 and about 1:1.

11. A method for producing biodiesel-quality esters, comprising:

introducing a first charge into a reactor, the first charge containing a first triglyceride-containing fat and an alcohol, wherein the first triglyceride-containing fat has an acid value over 2;

performing a first transesterification reaction in which the first triglyceride-containing fat is reacted with the alcohol to produce a first product;

settling the first product into a methyl ester-containing layer and a glycerol-containing layer;

decanting the glycerol-containing layer;

mixing a second charge with the first product, wherein the second charge includes a second triglyceride-containing fat, the second triglyceride-containing fat having an acid value of less than 2; and performing a second transesterification reaction after mixing the second charge with the first product.

12. The method of claim 11 wherein mixing the second charge includes mixing the second triglyceride-containing fat, which is different from the first triglyceride-containing fat, with the first product.

13. The method of claim 11 wherein mixing the second charge includes introducing additional alcohol to the reactor after decanting the glycerol-containing layer.

14. The method of claim 13 wherein the additional alcohol is about 90-100% of a stoichiometric amount needed to transesterify a triglyceride-containing fat in the second charge.

15. The method of claim 11, further comprising determining an end point of the first transesterification reaction before settling the first product based on at least one of a reaction time, a composition of the first product, and an appearance of the first product.

* * * * *